United States Patent [19]
Gerard

[11] 4,174,769
[45] Nov. 20, 1979

[54] DISC BRAKE AND A RESILIENT CLIP FOR SUCH A BRAKE

[75] Inventor: Jean L. Gérard, Paris, France

[73] Assignee: Societe Anonyme D.B.A., Paris, France

[21] Appl. No.: 883,100

[22] Filed: Mar. 3, 1978

[51] Int. Cl.² .............................................. F16D 65/02
[52] U.S. Cl. .................................................. 188/73.6
[58] Field of Search ..................... 188/73.4, 73.5, 73.6

[56] References Cited

U.S. PATENT DOCUMENTS

| 3,165,173 | 1/1965 | Thirion | 188/73.6 |
|---|---|---|---|
| 3,261,430 | 7/1966 | Wilson et al. | 188/73.6 |
| 4,053,031 | 10/1977 | Thioux | 188/73.6 |

FOREIGN PATENT DOCUMENTS 1242220  8/1971  United Kingdom .................... 188/73.6

Primary Examiner—Edward R. Kazenske

Attorney, Agent, or Firm—Paul D. Schoenle; Ken C. Decker

[57] ABSTRACT

A disc brake comprising a caliper straddling a rotary disc and carrying a pair of friction pads is disclosed. The friction pads are slidably received and anchor on guides defined by the circumferentially spaced edges of a radial aperture in the caliper. The caliper is slidably mounted on a fixed support member and carries a fluid pressure motor comprising a piston received in a cylinder and capable to occupy an idle position, an operating position closer to the disc than the idle position and a retracted position further from the disc than the idle position. Slots are provided in the guides to permit removal of the pads when the piston occupies its retracted position, and a detachable resilient clip is normally mounted on an axially extending portion of the cylinder between said cylinder and the adjacent pad to prevent the latter from moving back opposite the corresponding slot whatever the position occupied by the piston.

11 Claims, 3 Drawing Figures

DISC BRAKE AND A RESILIENT CLIP FOR SUCH A BRAKE

The invention relates to a disc brake for installation in the brake system of a motor vehicle, and to a resilient clip for a brake of this type.

More particularly, the invention relates to a disc brake of the type comprising a caliper straddling a rotary disc, operating means being associated with the caliper so as to urge at least one pad directly into frictional engagement with one face of the disc, the operating means defining an idle position, an operating position closer to the disc than the idle position and a retracted position further from the disc than the idle position, an aperture being provided in the caliper to permit extraction of the pad when the operating means are in their retracted position.

In disc brakes of this type it is relatively easy to remove the pad adjoining the operating means once the latter have retracted further from the disc than their idle position, through an aperture—preferably radial—large enough to permit extraction of the pad. However, jolting caused when the vehicle is travelling on roads in poor condition may cause the operating means to retract further from the disc than their idle position, and in certain extreme cases this may allow the pad to escape through the aperture in the caliper.

To overcome this disadvantage, the invention proposes a disc brake of the type defined above, in which at least one detachable member is normally located between the caliper and the pad to prevent the pad from moving back opposite the aperture.

It will be appreciated that such an arrangement is a very simple and effective way of preventing accidental escape of the pad.

According to another feature of the invention, the caliper may comprise a surface substantially parallel to the said disc face located in the vicinity of the operating means, the detachable member being inserted between the said surface and the pad. The operating means may then comprise at least one piston housed in a cylinder defined inside a housing associated with the caliper, the said surface being formed on the housing around that end of the cylinder closer to the disc.

According to a further feature of the invention, the cylinder may comprise an annular extension running towards the disc from the said surface, and the detachable member is associated with the outer peripheral surface of this annular extension. Preferably, the detachable member comprises a resilient clip which at least partly embraces the outer peripheral surface of the annular extension of the cylinder and which can be extracted parallel to the said face of the disc.

The invention also concerns a resilient clip suitable for a disc brake of the kind.

A particular embodiment of the invention will now be described by way of example with reference to the accompanying drawings, in which.

Figure 1:
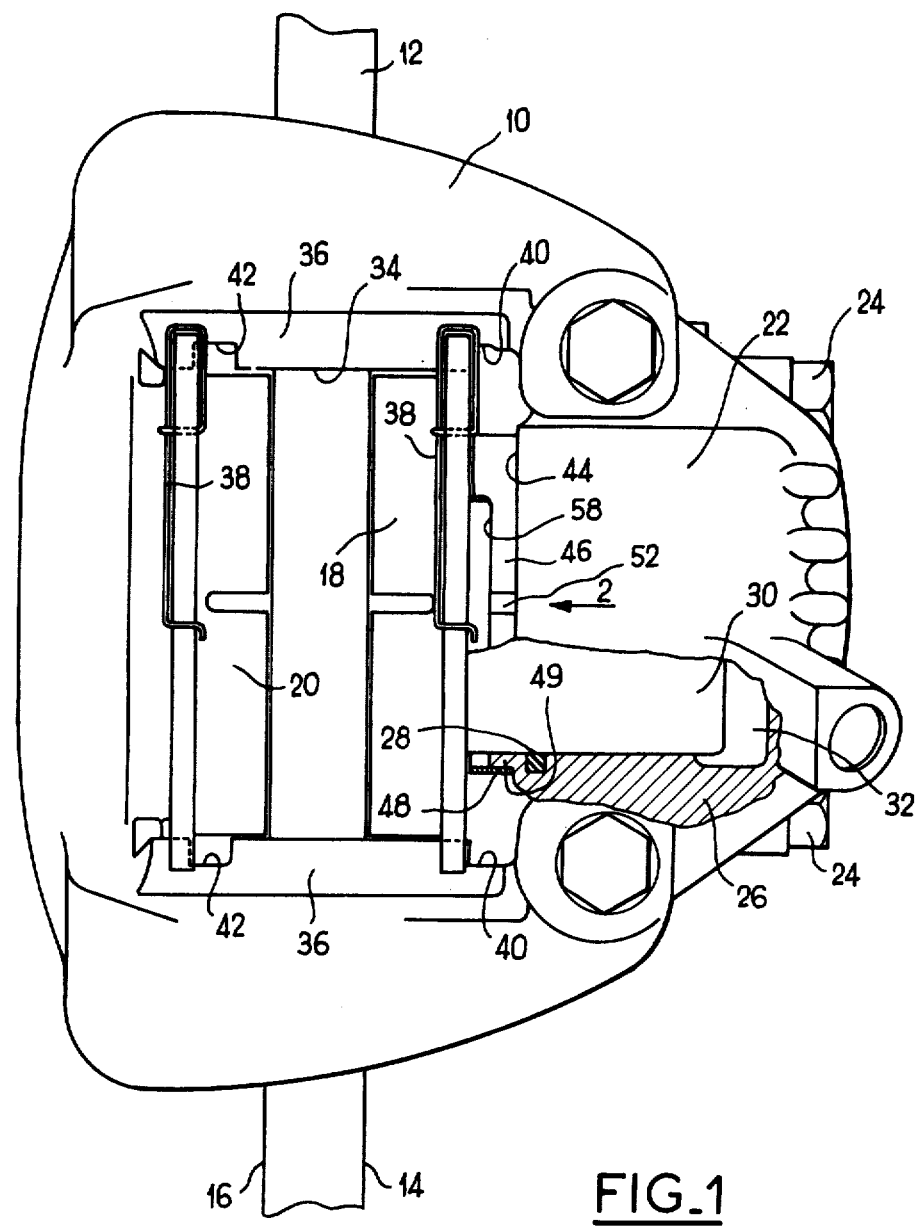
FIG. 1 is a plan view of a disc brake embodying the principles of the invention.

FIG. 1 illustrates a disc brake comprising a caliper 10 straddling a brake disc 12 designed to be associated with a rotary member such as a stub axle in the vehicle (not shown). The disc 12 has two friction surfaces or faces 14, 16 in whose vicinity there are respective friction pads 18, 20. Operating means 22 are associated with the caliper 10 so as to urge the pad 18 directly towards the face 14 of the disc 12. In the embodiment illustrated, the caliper 10 is slidably mounted by way of mounting pins 24 on a support member (not shown) associated with a fixed part of the vehicle, so as to urge the pad 20 into frictional engagement with the face 16 of the disc 12 by reaction on actuation of the operating means 22.

The operating means 22 comprise a housing 26 in which a blind bore 28 defines a cylinder receiving a piston 30. The piston 30 thus defines inside the blind bore 28 an operating chamber 32 which can be connected to a pressure fluid source, for example the master cylinder of the vehicle (not shown). In FIG. 1, the piston 30 is shown in its idle position, in which the pads 18, 20 bear new linings and are level with the friction faces 14, 16 of the disc 12, but do not interfere with the rotation of the disc. When pressure fluid is admitted to the operated chamber 32, the piston 30 is urged to the left in FIG. 1, bringing the pad 18 directly into frictional engagement with the face 14 of the disc 12, and the pad 20 by reaction into frictional engagement with the face 16 of the disc. The piston 30 now occupies an "operating" position which is offset towards the disc 12 relative to its idle position by a distance which varies with the wear on the friction linings of the pads 18, 20. As FIG. 1 shows, the dimensions of the operating chamber 32 are such that the piston 30 can also occupy a "retracted" position further from the disc 12 than its idle position, when the operating fluid is discharged from the chamber 32.

In the embodiment illustrated, the portion of the caliper 10 overhanging the disc 12 contains a substantially rectangular aperture 34, of which the circumferentially spaced edges define guides 36 which slidably receive and anchor the friction pads 18, 20. A wire spring 38 may be associated with each pad 18, 20 so as to cooperate with at least one of the guides 36, to act as a noise-reducing spring between the pads and the caliper and to immobilize the pads axially relative to the caliper between two operations of the operating means 22. A slot 40 is formed in each guide 36 at a point further from the disc 12 than the pad 18 in order to define with the aperture 34 an aperture whose dimensions permit radial extraction of the friction pad 18 when the latter is brought opposite the aperture so defined, after the piston 30 is moved towards its retracted position. Similarly, a slot 42 is formed in each guide 36 at a point closer to the disc 12 than those portions of the pad 20 which cooperate with the guides 36, so as to define with the aperture 34 an aperture whose dimensions permit radial extraction of this pad 20 after the pad 18 has been removed and after the caliper 10 has slid to the left in FIG. 1 along the mounting pins 24.

The brake just described operates satisfactorily but when the vehicle travels along surfaces in very poor condition and the brake is not applied, the piston is liable to move further from the disc than its idle position and may on occasion reach its retracted position. The friction pad 18 may then escape accidentally through the aperture defined by the slots 40 and aperture 34.

Figure 2:
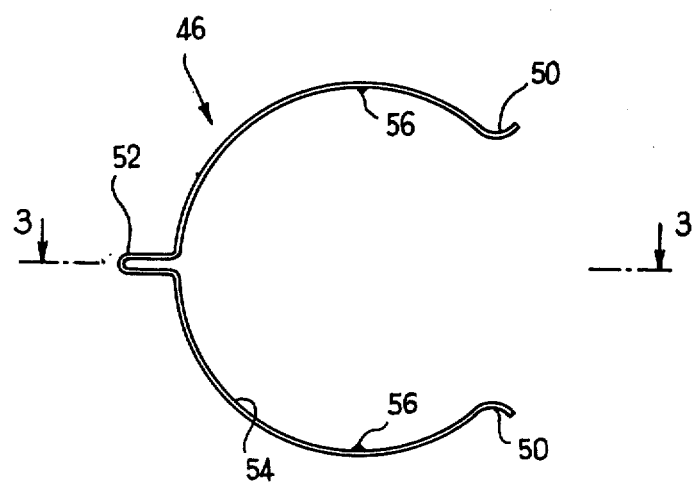
FIG. 2 is a view, in the direction indicated by an arrow 2 in FIG. 1, of the resilient clip in the disc brake shown in FIG. 1.
Figure 3:
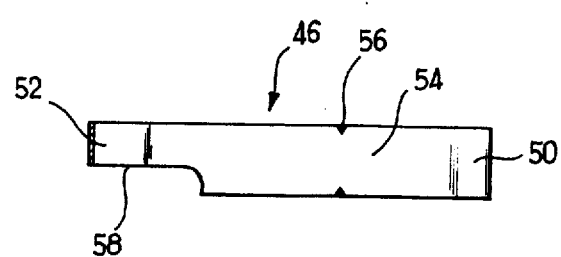
FIG. 3 represents a section through the clip shown in FIG. 2, along a line 3—3.

To eliminate the risk of escape of the pad 18, the invention proposes to place between the pad 18 and a substantially plane surface 44 defined round that end of the cylinder 28 closer to the disc 12 a detachable member 46 comprising a resilient clip, shown separately in FIGS. 2 and 3. The substantially plane surface 44 round that end of the cylinder 28 closer to the disc 12 is substantially parallel to the faces 14, 16 of the disc. Also, the cylinder 28 bears an annular extension 49 which extends towards the disc from the surface 44, and the resilient clip 46 is associated with the peripheral surface 48 of this annular extension 49 of the cylinder 28.

As best shown in FIGS. 2 and 3, the clip 46 comprises a resilient metal strip curved to define a generally cylindrical inner peripheral surface whose diameter when idle is smaller than the diameter of the annular extension 49. The strip 46 embraces approximately three-quarters of the peripheral surface 48 of the extension 49, and its ends 50 are bent radially outwards relative to the piston 30 to facilitate clipping of the clip 46 on to the cylinder extension 49. The metal strip 46 also has a radial projection 52 approximately halfway between its ends 50 and formed by a bent portion of the strip, designed to receive an appropriate extracting tool.

That surface 54 of the clip 46 which comes into contact with the peripheral surface 48 of the cylinder extension 49 preferably bears discontinuities, for example slightly bent portions 56 of the metal strip. The discontinuities enable the strip 46 to engage the peripheral surface 48 of the extension 49 without sliding, and they therefore prevent the clip 46 from moving relative to the cylinder, which might cause undesirable noise. Also, a recess 58 is formed in the metal strip 46 in the vicinity of the projection 52 to facilitate insertion of the extracting tool, which might be impeded by the pad or by the housing 26 of the operating means 22. In the embodiment illustrated, a single recess 58 is shown on the side facing the pad 18, but a recess could of course be provided on each side of the plate, on the side nearer the operating means 22 or in the central part of the plate.

When pressure fluid is admitted to the chamber 32 from the vehicle's master cylinder (not shown), in a known manner, the piston 30 urges the pad 18 directly into engagement with the face 14 of the disc 12 and urges the pad 20, due to reaction by way of the caliper 10, into engagement with the face 16 of the disc.

When the friction linings on the pads 18, 20 are worn, they are replaced as follows:

The resilient clip 46 is first extract parallel to the disc faces 14, 16 by inserting an appropriate tool, for example the end of a screwdriver, into the projection 52, whereupon the piston 30 is moved away from the disc into its "retracted" position. The pad 18 can then be brought opposite the aperture defined by the slots 40 and by the aperture 34 and can be extracted radially from the remainder of the brake. The assembly consisting of the caliper 10 and pad 20 is then urged to the left in FIG. 1 along the mounting pins 24, so that the pad 20 can be moved along the guides 36 until it is opposite the aperture defined by the slots 42 and by the aperture 34, whereupon it in turn can be extracted from the remainder of the brake. When pads equipped with new friction linings are inserted, the sequence of operations is the reverse of that just described with reference to the removal of pads bearing worn linings.

Mounting the clip 46 on the portion 48 of the outer surface of the cylinder 28 is of course a simple and effective way of eliminating all risk of accidental escape of the pad 18.

The invention is not restricted to the embodiment just described by way of example. In particular the caliper 10 may be attached directly to a fixed component of the brake, in which case operating means of the same type as those for the first pad will be provided for the second pad, removal of which will be symmetrical relative to removal of the first pad, a detachable member of the same kind as the member 46 being inserted between the second pad and the caliper. In addition, radial extraction of the pads can be performed through slots 40, 42 in only one of the guides 36 without departing from the scope of the invention.

Moreover, the shape and arrangement of the detachable member may of course be different from those described by way of example. Hence a detachable member of a different shape could be inserted between another part of the caliper and the pad 18. Similarly, the operating means are not restricted to one of more hydraulically operated pistons and may be constituted by any other form of control, for example a pneumatic or mechanical control. Furthermore, although the pads described by way of example slide and are anchored on the caliper, the invention also covers disc brakes in which the pads slide and are anchored in mixed fashion on the caliper and fixed support or entirely on the fixed support. In the latter case, the aperture which permits radial extraction of the pad may be merely a single longitudinal aperture whose dimensions slightly exceed those of the pad.

What we claim is:

1. In a disc brake, a rotary disc having a pair of friction faces; a pair of friction pads, each of said friction pads being located adjacent one of said friction faces; a fixed member; a caliper member carried by said fixed member and straddling said disc; brake operating means associated with the caliper member so as to urge at least a first of said pads directly into frictional engagement with the corresponding friction face of the disc; said brake operating means comprising movable piston means capable to occupy an idle position when the brake is released, an operating position closer to the disc than the idle position when the brake is applied, and a retracted position further from the disc than the idle position; said caliper member being provided with at least one aperture permitting extraction of said first pad when said piston means are in their retracted position; at least one detachable member normally located between said first pad and the caliper to prevent said first pad from moving back opposite said aperture whatever the position occupied by the piston means; the caliper defining a surface substantially parallel to the friction faces of the disc and facing said first pad, the detachable member being inserted between said surface and said first pad; said brake operating means further comprising a housing defining a cylinder portion receiving said piston means, said surface being formed on the housing around an end of the cylinder portion closer to the disc; and said cylinder portion comprising an annular extension running towards the disc from said surface, the detachable member being a resilient clip which at least partly embraces an outer peripheral surface of said annular extension, said resilient clip being adapted to be extracted parallel to the friction faces of the disc.

2. A disc brake as claimed in claim 1, wherein said clip is made from a resilient metal strip and embraces approximately three-quarters of the peripheral surface of said annular extension.

3. A disc brake as claimed in claim 2, wherein said strip defines a pair of ends which are bent radially outwards relative to said annular extension and at least one outwards radial projection located substantially halfway between said ends of the clip, said projection being adapted to receive an appropriate extracting tool.

4. A disc brake as claimed in claim 2, wherein discontinuities are provided on that surface of the strip which cooperates with the peripheral surface of said annular extension.

5. In a disc brake, a rotary disc having a pair of friction faces;

a pair of friction pads, each said friction pads being located adjacent one of said friction faces;

a fixed support member;

a caliper member slidably mounted on said support member, said caliper member having a brake actuating portion adjacent a first of said friction pads, a bridge portion extending over said disc and a reaction portion adjacent the other of said friction pads;

said bridge portion defining a substantially rectangular aperture having a pair of circumferentially spaced edges defining guides which slidably receive and anchor said friction pads;

said brake actuating portion comprising a housing defining a cylinder portion receiving at least one piston member, said piston member being capable to occupy an idle position on release of the brake, an operating position closer to the disc than the idle position on brake application, and a retracted position further from the disc than the idle poposition;

a first slot provided in at least one of said guides to permit radial extraction of said first friction pad when said piston member is in its retracted position;

a second slot provided in at least one of said guides to permit radial extraction of said other friction pad after radial extraction of said first friction pad;

said cylinder portion defining an annular extension surrounding said piston member and extending towards the disc; and a resilient clip removably received on said annular extension and abutting on that face of said first friction pad adjacent to the piston member and on an appropriate surface of said cylinder portion surrounding said annular extension and facing said face of the first friction pad, said clip being adapted to prevent said first pad from moving back opposite said aperture whatever the position occupied by said piston member.

6. A disc brake as claimed in claim 5, wherein said clip comprises at least one projection which extends radially relative to said piston member, said projection being capable of receiving an appropriate extracting tool.

7. A disc brake as claimed in claim 6, wherein said clip defines a pair of ends, said projection being approximately halfway between the two ends of the clip.

8. A disc brake as claimed in claim 6, wherein at least one recess is formed in the clip in the vicinity of said radial projection.

9. A disc brake as claimed in claim 5, wherein the clip comprises an annular, resilient metal strip which embraces approximately three-quarters of said annular extension.

10. A disc brake as claimed in claim 9, wherein said strip defines a pair of ends which are bent radially outwards relative to the annular extension to facilitate introduction of the clip.

11. A disc brake as claimed in claim 5, wherein the clip comprises discontinuities which grippingly cooperate with said annular extension.

* * * * *